US012112934B2

(12) United States Patent
Le Blanc

(10) Patent No.: US 12,112,934 B2
(45) Date of Patent: Oct. 8, 2024

(54) METHOD FOR MASS SPECTROMETRY

(71) Applicant: DH TECHNOLOGIES DEVELOPMENT PTE. LTD., Singapore (SG)

(72) Inventor: Yves Le Blanc, Newmarket (CA)

( * ) Notice: Subject to any disclaimer, the term of this patent is extended or adjusted under 35 U.S.C. 154(b) by 417 days.

(21) Appl. No.: 17/753,036

(22) PCT Filed: Aug. 22, 2020

(86) PCT No.: PCT/IB2020/057883
§ 371 (c)(1),
(2) Date: Feb. 16, 2022

(87) PCT Pub. No.: WO2021/038418
PCT Pub. Date: Mar. 4, 2021

(65) Prior Publication Data

US 2022/0359178 A1 Nov. 10, 2022

Related U.S. Application Data

(60) Provisional application No. 62/894,356, filed on Aug. 30, 2019.

(51) Int. Cl.
*H01J 49/00* (2006.01)
*H01J 49/10* (2006.01)

(52) U.S. Cl.
CPC ...... *H01J 49/0036* (2013.01); *H01J 49/0045* (2013.01); *H01J 49/10* (2013.01)

(58) Field of Classification Search
CPC .... H01J 49/0036; H01J 49/0009; H01J 49/10; H01J 49/0045; H01J 49/0027; H01J 49/30; H01J 49/165; H01J 49/168
See application file for complete search history.

(56) References Cited

U.S. PATENT DOCUMENTS 6,369,382 B1 4/2002 Ito et al.
2019/0237314 A1* 8/2019 King, III .............. G01N 27/623

FOREIGN PATENT DOCUMENTS

GB 2520151 A 4/2002
WO 2017024972 A1 3/2017

OTHER PUBLICATIONS

International Search Report and Written Opinion for PCT/IB2020/057883, mailed Nov. 29, 2020.

* cited by examiner

*Primary Examiner* — David E Smith
*Assistant Examiner* — Hsien C Tsai
(74) *Attorney, Agent, or Firm* — Kasha Law LLC; John R. Kasha; Kelly L. Kasha

(57) ABSTRACT

Before each sample of a series of batch samples is introduced into a liquid sample delivery device, an ion source device receives aqueous mobile phase solution from the liquid sample delivery device and ionizes its compounds, producing an ion beam. A tandem mass spectrometer performs a neutral loss or precursor ion scan on the ion beam to measure intensities of two or more precursor ions corresponding to a known aqueous mobile phase solution compound. Intensity measurements for each of the two or more different precursor ions are compared to previously stored intensities to determine the threshold times at which these measurements indicate orifice contamination. A threshold time is then predicted for a known compound of interest of the batch samples based on the m/z value of the known compound of interest and the m/z value and the threshold time of each of the two or more different precursor ions.

15 Claims, 10 Drawing Sheets

100

600

900

METHOD FOR MASS SPECTROMETRY

RELATED APPLICATIONS

This application claims the benefit of U.S. Provisional Patent Application Ser. No. 62/894,356 filed on Aug. 30, 2019, the content of which is incorporated by reference herein in its entirety.

INTRODUCTION

The teachings herein relate to mass spectrometry apparatus for predicting during a batch sample analysis when a measurement of a known compound of interest will be affected by mass spectrometer orifice contamination. More specifically, an ion source device and a tandem mass spectrometer are used to measure protonated solvent related ions of an aqueous mobile phase solution of a liquid sample delivery device before each sample of a series of batch samples is analyzed for a known compound. The measurements of the protonated solvent related ions are used to predict when a measurement of the known compound will be affected by contamination of the orifice of the tandem mass spectrometer.

The apparatus and methods disclosed herein can be performed in conjunction with a processor, controller, microcontroller, or computer system, such as the computer system of FIG. 1.

Mass Spectrometry Background

Mass spectrometry (MS) is an analytical technique for detection and quantitation of chemical compounds based on the analysis of m/z values of ions formed from those compounds. MS involves ionization of one or more compounds of interest from a sample, producing precursor ions, and mass analysis of the precursor ions.

Tandem mass spectrometry or mass spectrometry/mass spectrometry (MS/MS) involves ionization of one or more compounds of interest from a sample, selection of one or more precursor ions of the one or more compounds, fragmentation of the one or more precursor ions into product ions, and mass analysis of the product ions.

Both MS and MS/MS can provide qualitative and quantitative information. The measured precursor or product ion spectrum can be used to identify a molecule of interest. The intensities of precursor ions and product ions can also be used to quantitate the amount of the compound present in a sample.

Tandem mass spectrometry can be performed using many different types of scan modes. For example, quadrupole tandem mass spectrometers can typically perform a product ion scan, a neutral loss scan, a precursor ion scan, and a selected reaction monitoring (SRM) or a multiple reaction monitoring (MRM) scan.

A product ion scan typically follows the MS/MS method described above. A collection of precursor ions is selected by a quadrupole mass filter. Each of the precursor ions of the collection is fragmented in a quadrupole collision cell. All of the resulting product ions for each precursor ion are then selected and mass analyzed using a quadrupole mass analyzer, producing a product ion spectrum for each precursor ion. A product ion scan is used, for example, to identify all of the products of a particular precursor ion.

In a neutral loss scan, both a first mass analyzer (Q1) and a second mass analyzer (Q3) scan a mass range, a fixed mass apart. A response or intensity and m/z is observed or measured for the precursor ion, if the precursor ion chosen by the Q1 quadrupole fragments by losing the neutral loss (the fixed mass) specified. This scan is used to confirm the presence of a precursor ion or, more commonly, to identify compounds sharing a common neutral loss.

In a precursor ion scan, the Q3 second mass analyzer is fixed at a specified mass-to-charge ratio to transmit a specific product ion and the Q1 mas analyzer scans a mass range. A response or intensity and m/z is observed or measured for the precursor ion, if the specific product ion is found. This scan is used to confirm the presence of a precursor ion or, more commonly, to identify compounds sharing a common product ion.

In an SRM or MRM scan, at least one precursor ion and product ion pair is known in advance. The quadrupole mass filter then selects the one precursor ion. The quadrupole collision cell fragments the precursor ion. However, only product ions with the m/z of the product ion of the precursor ion and product ion pair are selected and mass analyzed using a quadrupole mass analyzer, producing an intensity for the product ion of the precursor ion and product ion pair. In other words, only one product ion is monitored. An SRM or MRM scan is used, for example, primarily for quantitation.

Liquid Sample Delivery Device Background

FIG. 2 is an exemplary diagram of a liquid sample delivery device 200 for a mass spectrometer. Liquid sample delivery device 200 includes two separate devices. It includes high-performance liquid chromatography (HPLC) device 210 and direct infusion or injection device 220.

In HPLC device 210, one of two solvents 211 or 212 is selected using valve 215. Solvents 211 or 212 are moved to valve 215 using pumps 213 and 214, respectively. Sample 216 is mixed with the selected solvent using mixer 217, and the resulting mixture is sent through liquid chromatography (LC) column 218. Sample 216 is selected using autosampler 219, for example.

In direct infusion or injection device 220, a sample is already mixed with a solvent in fluidic pump 221. Fluidic pump 221 is shown as a syringe pump but can be any type of pump.

The use of HPLC device 210 or direct infusion or injection device 220 is selected using valve 230. The selected mixture or mobile phase composition is sent from valve 230 to an ion source (not shown) of a mass spectrometer (not shown).

Mobile phase additives (not shown) can also be added to the mixture of HPLC device 210 before LC column 218 or to the mixture already in fluidic pump 221 of direct infusion or injection device 220.

Batch Run Contamination Problem

One problem encountered when a liquid sample delivery device is coupled to a mass spectrometer is the contamination of the orifice of the mass spectrometer. Specifically, this contamination is the buildup of charge on the orifice over time. This buildup of charge is due to the continuous ionization of samples provided by the liquid sample delivery device. As the orifice get contaminated due to the charge buildup, low mass sample compound intensity starts to be affected to the point of not being detectable by the mass spectrometer. Eventually, even the higher mass ions detected from the mobile phase of the liquid sample delivery device are also blocked and not transmitted as additional charge buildup accumulates on the orifice. As a result, the overall performance of the coupled system deteriorates over time.

Currently, assessing if the performance of a liquid sample delivery coupled mass spectrometry system is deteriorating and at what rate the performance is deteriorating is difficult. Most liquid sample delivery coupled mass spectrometry analyses are performed in batch mode. This means that a large number (>100) sample experiments are analyzed by the system in series. Typically, the performance of the system is only assessed prior to start of a batch run. It is expected that the performance of the system will be maintained for the duration of the batch run. In addition, it is expected that any loss in performance can be corrected by the addition of internal standards to the batch samples.

Under these conditions, it is not uncommon to find a situation where a batch run does not complete properly and data is discarded due to loss in sensitivity of the mass spectrometry measurements. This leads to expensive and time-consuming reanalysis of the samples. As a result, additional systems and methods are needed to assess the performance of a liquid sample delivery coupled mass spectrometry system during a batch analysis and to predict when mass spectrometer orifice contamination will affect sample analysis.

International Patent Application Publication No. WO2017034972 (hereinafter the "'972 Publication") describes a method of monitoring the performance of an atmospheric pressure ionization (API) system. Specifically, the '972 Publication provides a method in which an ion-molecule cluster that is formed in the API system is monitored. Once the ion-molecule cluster is identified, it is monitored along with sample ions using an SRM scan.

SUMMARY

An apparatus, method, and computer program product are disclosed for predicting during a batch sample analysis when a measurement of a known compound of interest will be affected by mass spectrometer orifice contamination. The apparatus includes an ion source device and a tandem mass spectrometer.

Before each sample of a series of batch samples is introduced into a liquid sample delivery device, the ion source device receives aqueous mobile phase solution from the liquid sample delivery device and ionizes compounds of the aqueous mobile phase solution. An ion beam of aqueous mobile phase solution compounds is produced.

Also, before each sample of the series of batch samples is introduced into the liquid sample delivery device, the tandem mass spectrometer receives the ion beam of aqueous mobile phase solution compounds from the ion source device. The tandem mass spectrometer performs a neutral loss or precursor ion scan to measure intensities of two or more precursor ions with different m/z values corresponding to a known aqueous mobile phase solution compound of the ion beam. An intensity measurement for each of the two or more different precursor ions is produced. The tandem mass spectrometer stores the measured intensity and time for each of the two or more different precursor ions in a memory device.

The tandem mass spectrometer compares the measured intensity of each of the two or more different precursor ions with a previously measured intensity stored in the memory device. The comparison is performed until a threshold time is found for each of the two or more different precursor ions. A threshold time is where a measured intensity of each of the two or more different precursor ions is reduced below a threshold intensity due to contamination of the orifice of the tandem mass spectrometer. Finally, the tandem mass spectrometer predicts a time when an intensity of a known compound of interest of the batch samples is reduced due to contamination of the orifice. The prediction is based on an m/z value of the known compound of interest and an m/z value and the threshold time of each of the two or more different precursor ions.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
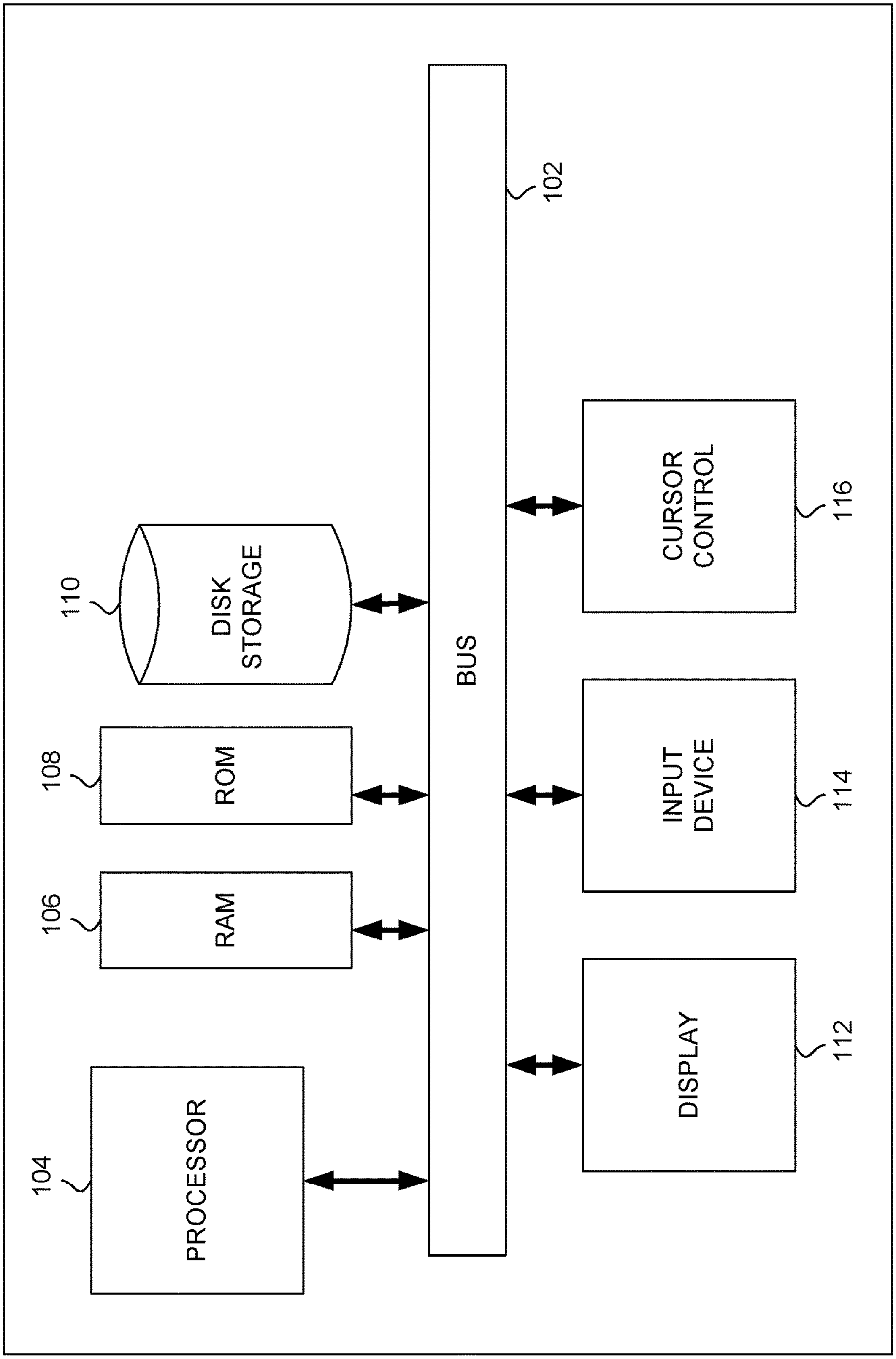
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Apparatus for Predicting Orifice Contamination

As described above, one problem encountered when a liquid sample delivery device is coupled to a mass spectrometer is the contamination of the orifice of the mass spectrometer. Specifically, this contamination is the buildup of charge on the orifice over time. This buildup of charge is due to the continuous ionization of samples provided by the liquid sample delivery device, and this buildup of charge can reduce the overall performance of the coupled system over time.

Most liquid sample delivery coupled mass spectrometry analyses are performed in batch mode, and, typically, the performance of the system is only assessed prior to the start of a batch run. Under these conditions, it is not uncommon to find a situation where a batch run does not complete properly, and data is discarded due to a loss in sensitivity of the mass spectrometry measurements. This leads to expensive and time-consuming reanalysis of the samples.

As a result, additional systems and methods are needed to assess the performance of a liquid sample delivery coupled mass spectrometry system during a batch analysis and to predict when mass spectrometer orifice contamination will affect sample analysis. The '972 Publication describes methods to monitor the performance of an atmospheric pressure ionization (API) system and to determine if a sample previously ran correctly. However, the '972 Publication is not directed to predicting when mass spectrometer orifice contamination will affect sample analysis. Consequently, additional methods are needed to predict when mass spectrometer orifice contamination will affect sample analysis during a batch analysis.

In various embodiments, apparatus and methods are provided to predict when an intensity of a known compound of interest of a sample will be affected by mass spectrometer orifice contamination. Before each sample of the series of batch samples, the apparatus and methods perform two or more neutral loss or precursor ion scans to measure intensities of two or more precursor ions with different m/z values corresponding to two or more known aqueous mobile phase solution compounds. An intensity measurement for each of the two or more different precursor ions is obtained and stored.

The current intensity measurement for each of the two or more different precursor ions is compared to a previously stored intensity measurement until a threshold time is found for each of the two or more different precursor ions where a measured intensity of each of the two or more different precursor ions is reduced below a threshold intensity. In other words, a threshold time is found for each of the two or more different precursor ions where the intensity is first reduced due to mass spectrometer orifice contamination.

A time when an intensity of a known compound of interest of the batch samples is reduced is predicted based on the m/z value and the threshold time of each of the two or more different precursor ions. In other words, because the two or more different precursor ions are affected by orifice contamination before the known compound of interest, the time at which the known compound of interest is affected can be predicted before it occurs.

This ability to assess the sensitivity loss as a function of time provides guidance as to when the system needs to be stopped for maintenance or predicts when a user should stop their batch based on the decay rate as a function of sample introductions. As an analogy, it is like having a warning light that comes on when one is about to run out of gas. There is still enough gas to reach next gas station, but one should not plan for a trip extension at that point.

For the majority of LC-MS analyses, for example, the common solvents used are a mixture of water and methanol or water and acetonitrile. Additional mobile phase additives or buffers are frequently used in combination with these solvents. When mobile phase ions are generated by the source, either in electrospray ionization (ESI) or atmospheric pressure chemical ionization (APCI), it is possible to monitor a series of protonated solvent related ions (as well as dimers, trimers, and tetramers) that are naturally generated by the source. These solvent related ions generally have a lower mass or m/z than compounds of interest. It is possible to selectively monitor via MS/MS these low mass compounds that are generated by most mobile phase methods. These low mass compounds are more sensitive to front-end contamination than the compounds of interest and can be used to predict at what point in time the LC-MS system will lose the signals associated with the one or more compounds of interest currently being monitored.

For instance, by performing a precursor ion scan of m/z 41 (mass of acetonitrile), a series of low mass ions ranging from 41 to 200 m/z can be used to track the sensitivity of the system over time. As the orifice get contaminated due to charge build-up, the intensity of the low mass compounds will be affected to the point of not being detected. Eventually, even the higher mass ions detected from the mobile phase will also be blocked and not-transmitted as additional charge build-up accumulates on the orifice.

In various embodiments, using the rate of disappearance of these masses, it is possible to predict the point at which other masses will be affected by this buildup. The use of MS/MS scans (a precursor ion scan or a neutral loss scan) greatly simplifies the spectra and yields only a few reliable masses that can be used to track orifice contamination.

In various embodiments, this MS/MS information is collected before each sample analysis (for example when an autosampler is picking up sample). By monitoring over time the sensitivity of these low masses before each sample that is part of a batch of samples, it is possible to predict when the system will lose performance beyond a certain point. This information is used to inform the user when contamination will adversely affect their assay and to suggest to the user a time when the mass spectrometer should be "cleaned."

In various embodiments, this diagnostic information is provided in an agnostic way with little or no information supplied by the user. This diagnostic information is provided based on experimental conditions normally provided in any batch analysis and based on known information about typical aqueous mobile phase solutions.

Contamination Prediction Apparatus

Figure 3:
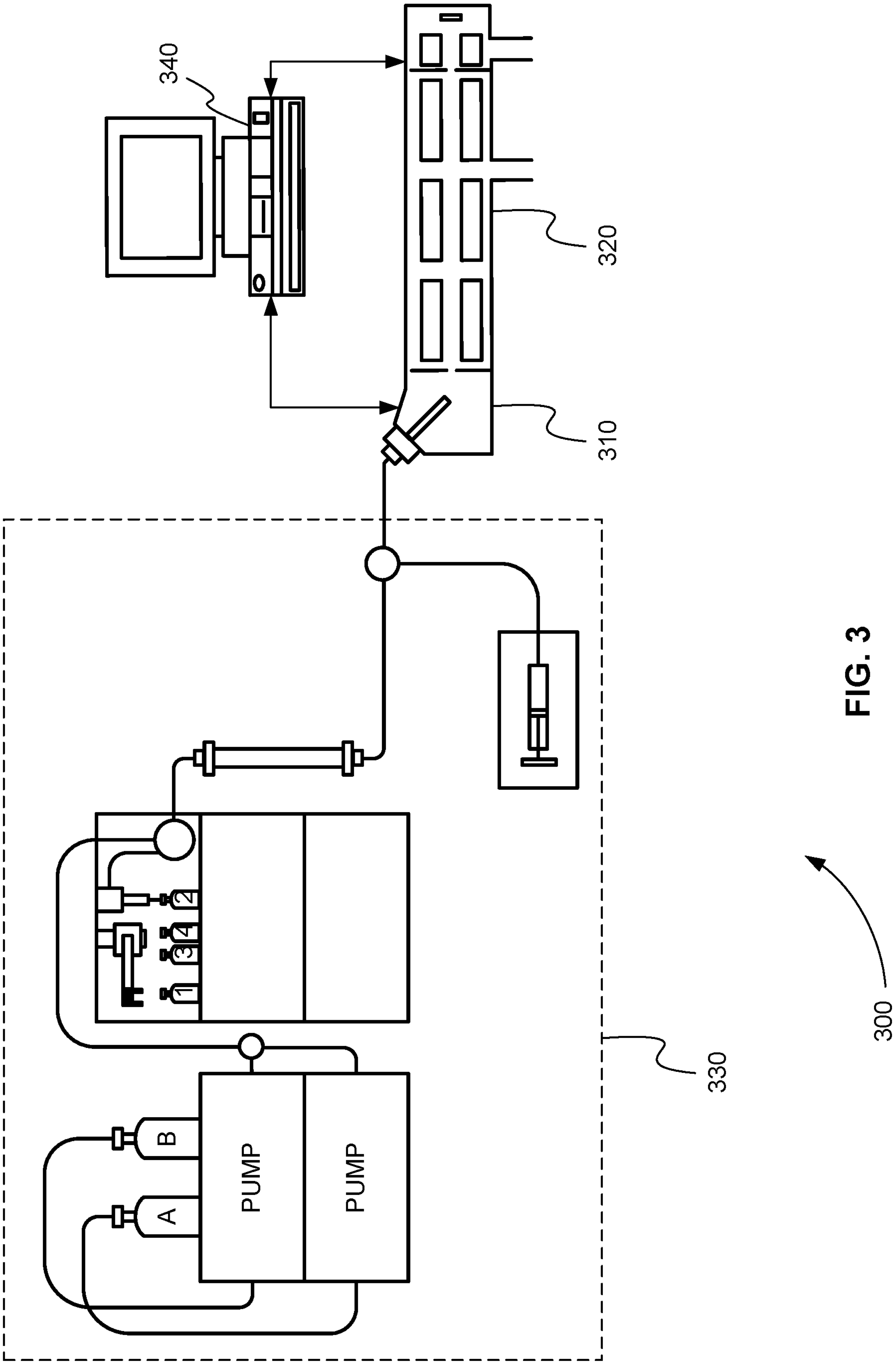
FIG. 3 is a schematic diagram of apparatus for predicting during a batch sample analysis when a measurement of a known compound of interest will be affected by mass spectrometer orifice contamination, in accordance with various embodiments.

FIG. 3 is a schematic diagram 300 of apparatus for predicting during a batch sample analysis when a measurement of a known compound of interest will be affected by mass spectrometer orifice contamination, in accordance with various embodiments. The apparatus includes ion source device 310 and tandem mass spectrometer 320.

Ion source device 310 is preferably an electrospray ionization (ESI) ion source device or an atmospheric pressure chemical ionization (APCI) ion source device. In various alternative embodiments, ion source device 310 can be any type of ion source device.

Tandem mass spectrometer 320 is preferably a triple quadrupole (QqQ) device or a quadrupole quadrupole linear ion trap (QqLIT) device. In various alternative embodiments, tandem mass spectrometer 320 can be any type of tandem mass spectrometer capable of performing a neutral loss scan or pseudo-neutral loss scan. For example, a quadrupole-time-of-flight device (QTOF) can be used where a pseudo-neutral loss scan can be done by performing lo-hi collision energy (CE) scans and alignment based on an exact m/z shift.

Figure 2:
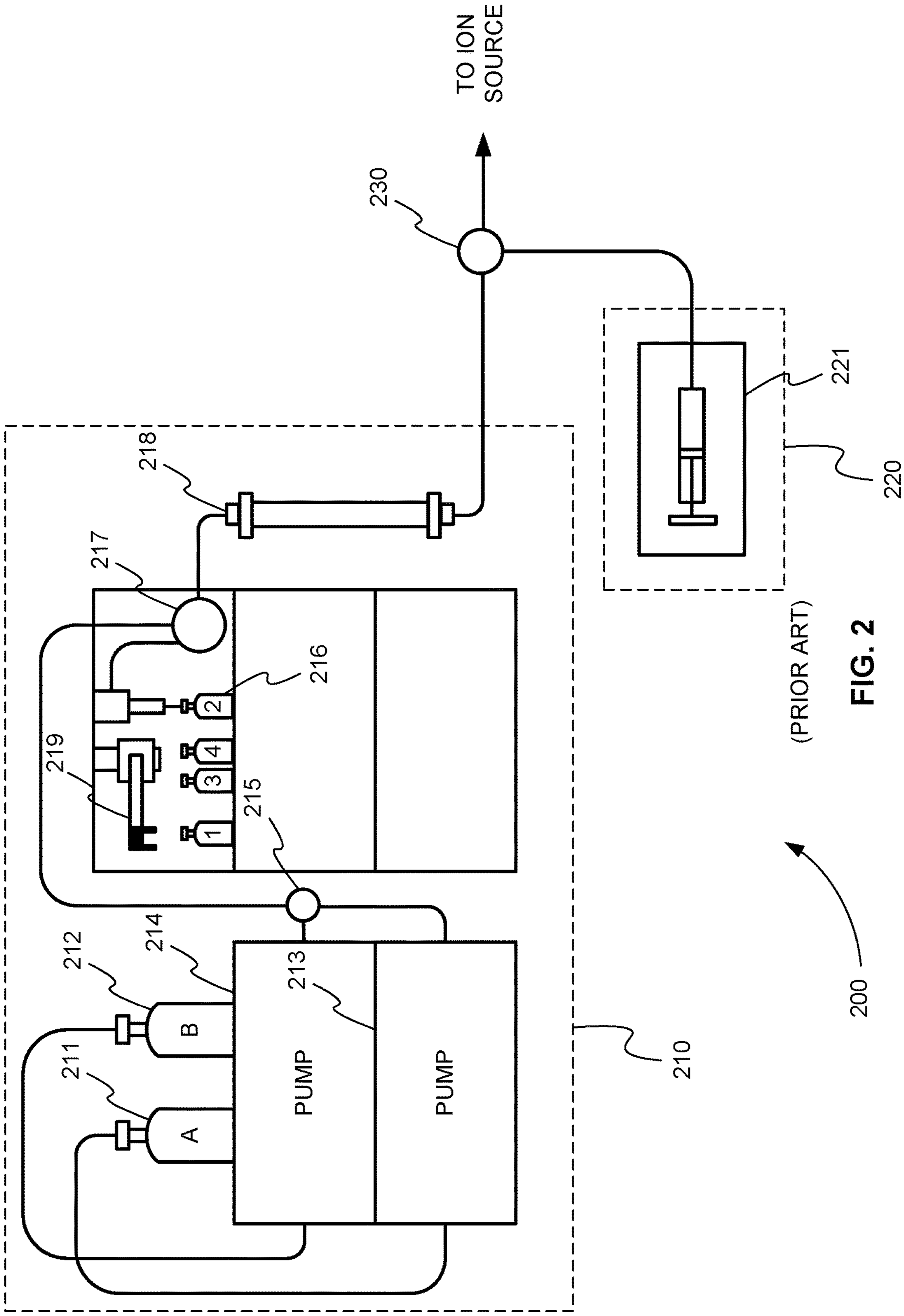
(PRIOR ART) FIG. 2
FIG. 2 is an exemplary diagram of a liquid sample delivery device for a mass spectrometer.

Before each sample of a series of batch samples is introduced into liquid sample delivery device 330, ion source device 310 receives aqueous mobile phase solution from liquid sample delivery device 330 and ionizes compounds of the aqueous mobile phase solution, producing an ion beam of aqueous mobile phase solution compounds. Liquid sample delivery device 330 is, for example, the liquid sample delivery device of FIG. 2.

Also, before each sample of a series of batch samples is introduced into liquid sample delivery device 330, tandem mass spectrometer 320 receives the ion beam of aqueous mobile phase solution compounds from ion source device 310. Tandem mass spectrometer 320 performs a neutral loss or precursor ion scan to measure intensities of two or more precursor ions with different mass-to-charge ratio (m/z) values corresponding to a known aqueous mobile phase solution compound of the ion beam, producing an intensity measurement for each of the two or more different precursor ions. Tandem mass spectrometer 320 stores the measured intensity and time for each of the two or more different precursor ions in a memory device (not shown). The memory device can be a memory device of processor 340, for example.

Tandem mass spectrometer 320 compares the measured intensity of each of the two or more different precursor ions with a previously measured intensity stored in the memory device until a threshold time is found for each of the two or more different precursor ions. A threshold time is where a measured intensity of each of the two or more different precursor ions is reduced below a threshold intensity due to contamination of the orifice of tandem mass spectrometer 320. Finally, tandem mass spectrometer 320 predicts a time when an intensity of a known compound of interest of the batch samples is reduced due to contamination of the orifice based on an m/z value of the known compound of interest and an m/z value and the threshold time of each of the two or more different precursor ions.

Figure 4:
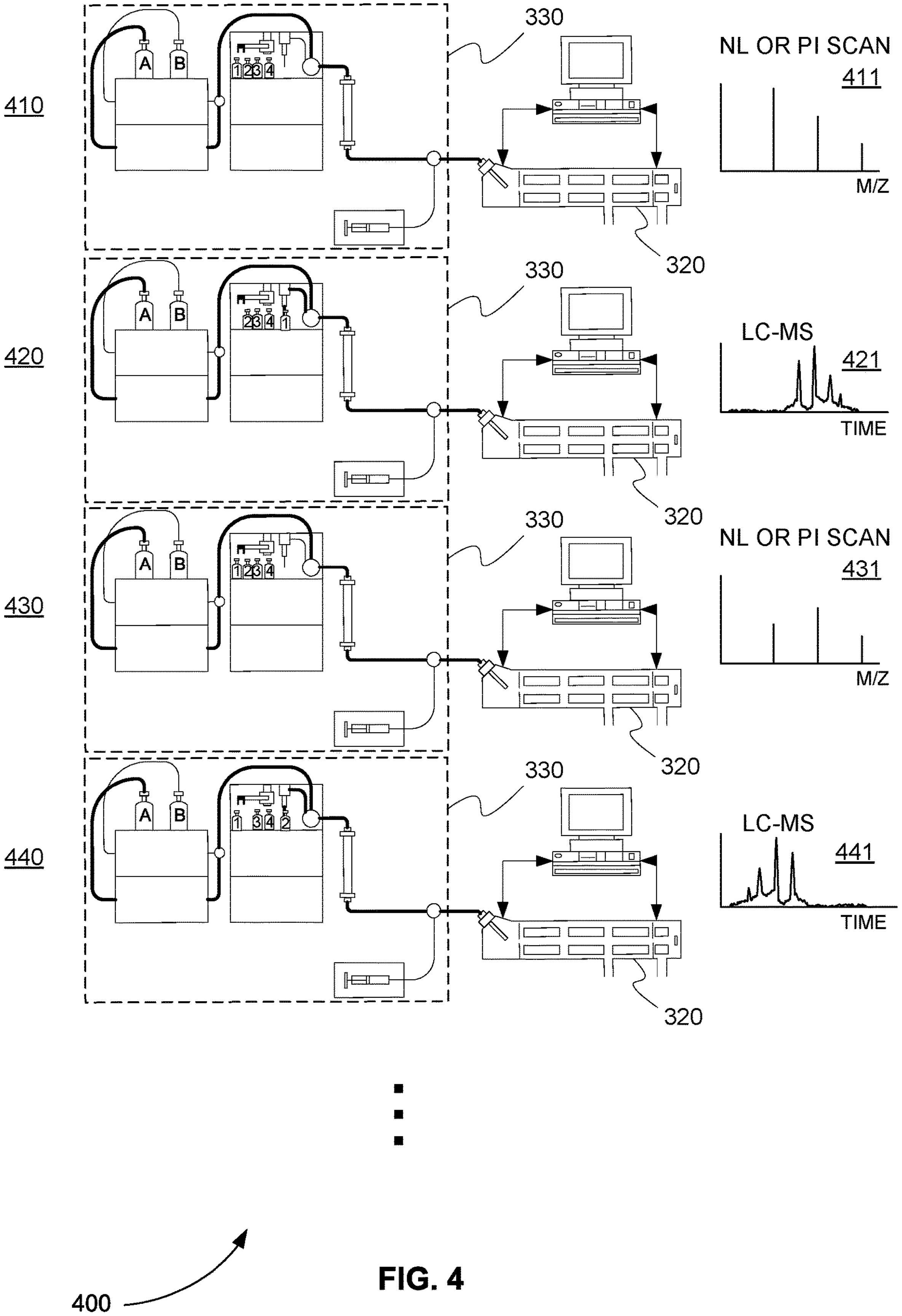
FIG. 4 is a schematic diagram showing how a diagnostic experiment is performed before each sample of a series of batch samples is introduced into a liquid sample delivery device to predict when mass spectrometer orifice contamination will first affect a known compound of interest, in accordance with various embodiments.

FIG. 4 is a schematic diagram 400 showing how a diagnostic experiment is performed before each sample of a series of batch samples is introduced into a liquid sample delivery device to predict when mass spectrometer orifice contamination will first affect a known compound of interest, in accordance with various embodiments. For example, diagnostic experiment 410 is performed before a sample of a series of batch samples is introduced into liquid sample delivery device 330.

As described above, before each sample of a series of batch samples is introduced into liquid sample delivery device 330, tandem mass spectrometer 320 performs a neutral loss or precursor ion scan to measure intensities of two or more precursor ions with different mass-to-charge ratio (m/z) values corresponding to a known aqueous mobile phase solution compound, producing an intensity measurement for each of the two or more different precursor ions. In diagnostic experiment 410, tandem mass spectrometer 320 performs a neutral loss or precursor ion scan for a known aqueous mobile phase solution compound. Neutral loss or precursor ion spectrum 411 is produced showing intensities for three different precursor ions.

After diagnostic experiment 410, a sample is introduced into liquid sample delivery device 330, and sample experiment 420 is performed. In sample experiment 420, the autosampler of liquid sample delivery device 330 selects sample 1, and this sample is analyzed using LC-MS. Chromatogram 421, for example, is produced from the LC-MS analysis of sample 1.

After sample experiment 420, diagnostic experiment 430 is performed on the aqueous mobile phase solution only. In diagnostic experiment 430, tandem mass spectrometer 320 again performs the same neutral loss or precursor ion scan for a known aqueous mobile phase solution compound. Neutral loss or precursor ion spectrum 431 is produced again showing intensities for three different precursor ions.

In diagnostic experiment 430, the intensities of the three different precursor ions of spectrum 431 are compared to the intensities of the three different precursor ions of spectrum 411. These intensities are compared to find a threshold time for one or more of the three different precursor ions. As described above, a threshold time is where a measured intensity of a precursor ion is reduced below a threshold intensity due to contamination of the orifice of tandem mass spectrometer 320.

Comparing spectrum 431 to spectrum 411 shows that the intensity of the first precursor ion is significantly lower in experiment 430 than in experiment 410. Objectively, if this intensity is below a threshold intensity, then this first precursor ion is found to have threshold time during experiment 430. In other words, the first precursor ion of spectrum 431 is found to be reduced due to contamination of the orifice of tandem mass spectrometer 320 during experiment 430.

Sample analysis continues, however. For example, another sample is introduced into liquid sample delivery device 330, and sample experiment 440 is performed. In sample experiment 440, the autosampler of liquid sample delivery device 330 selects sample 2, and this sample is analyzed using LC-MS. Chromatogram 441, for example, is produced from the LC-MS analysis of sample 2.

Diagnostic experiments followed by sample experiments continue until a threshold time is found for each of the three precursor ions of the spectrum 431, for example. Once a threshold time is found for each of the three precursor ions, tandem mass spectrometer 320 predicts a time when a known compound of interest in the batch sample will also be affected by orifice contamination. For example, it extrapolates the threshold time of the known compound of interest from the m/z value of the known compound of interest and the threshold times and m/z values of the three precursor ions.

As described above, ions with lower m/z values are affected by orifice contamination before ions with higher m/z values. As a result, so long as the m/z value of the known compound of interest is greater than the m/z values of the precursor ions used, contamination of the known compound of interest can be predicted before it occurs or before it has a negative impact on the batch currently being analyzed.

Figure 5:
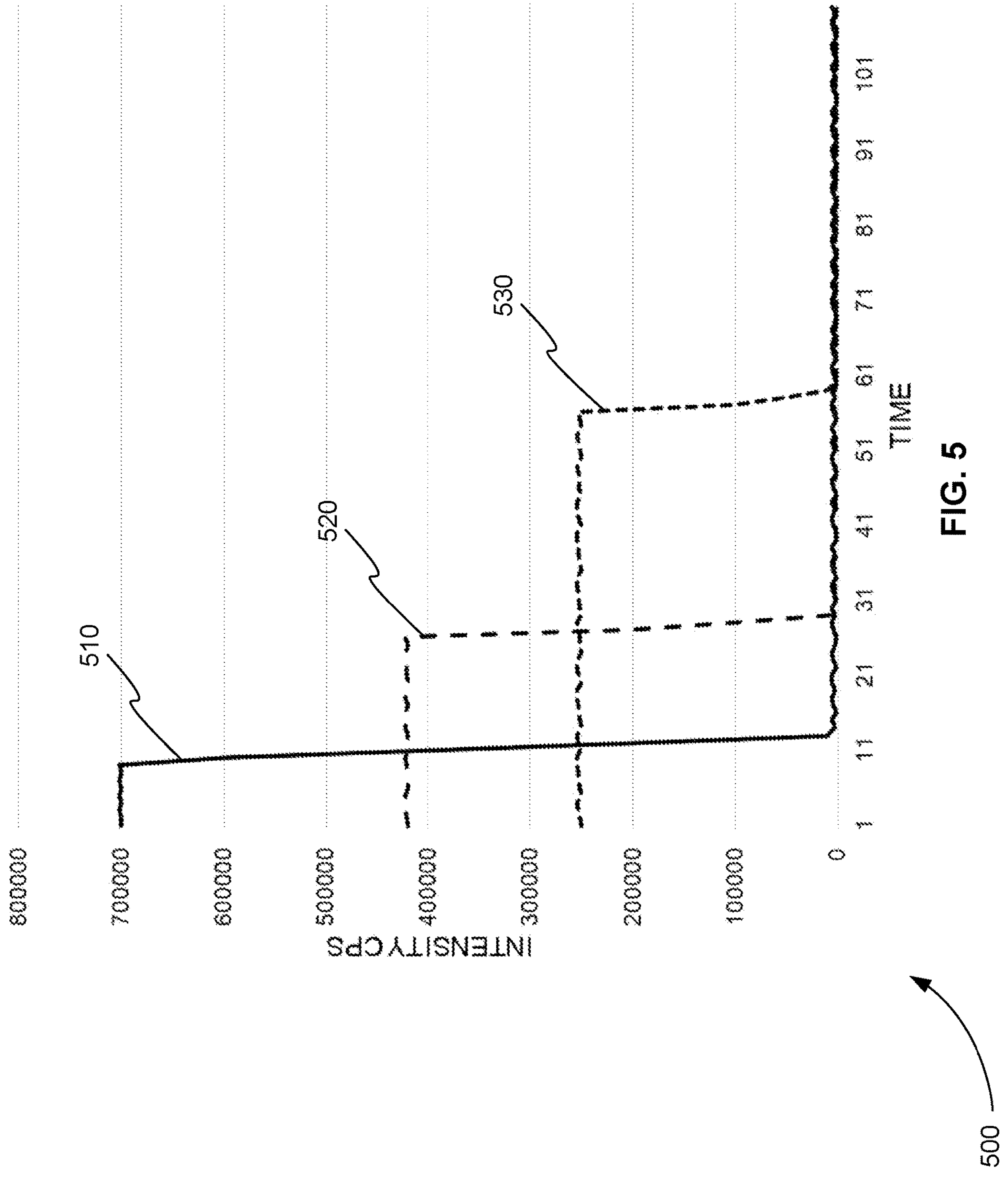
FIG. 5 is an exemplary plot of hypothetical intensities of three precursor ions corresponding to a known aqueous mobile phase solution compound plotted as a function of time and shows how each of the hypothetical intensities is affected by orifice contamination, in accordance with various embodiments.

FIG. 5 is an exemplary plot 500 of hypothetical intensities of three precursor ions corresponding to a known aqueous mobile phase solution compound plotted as a function of time and shows how each of the hypothetical intensities is affected by orifice contamination, in accordance with various embodiments. The intensities of three precursor ions were hypothetically measured, for example, using a precursor ion scan before each sample of a series of batch samples was introduced into a liquid sample delivery device. Intensities 510, 520, and 530 are for precursor ions with m/z values of 41, 110, and 230, respectively. FIG. 5 shows that intensity 510 of the precursor ion at 41 m/z decreases below a threshold intensity of more than 10% at time 10. This time is the threshold time for the precursor ion at 41 m/z. Similarly, FIG. 5 shows that the precursor ion at 110 m/z has a threshold time of 27 and the precursor ion at 230 m/z has a threshold time of 57. From the m/z value and the threshold time of each of these three precursor ions, a threshold time for a known compound of interest with a known m/z value can be predicted.

Figure 6:
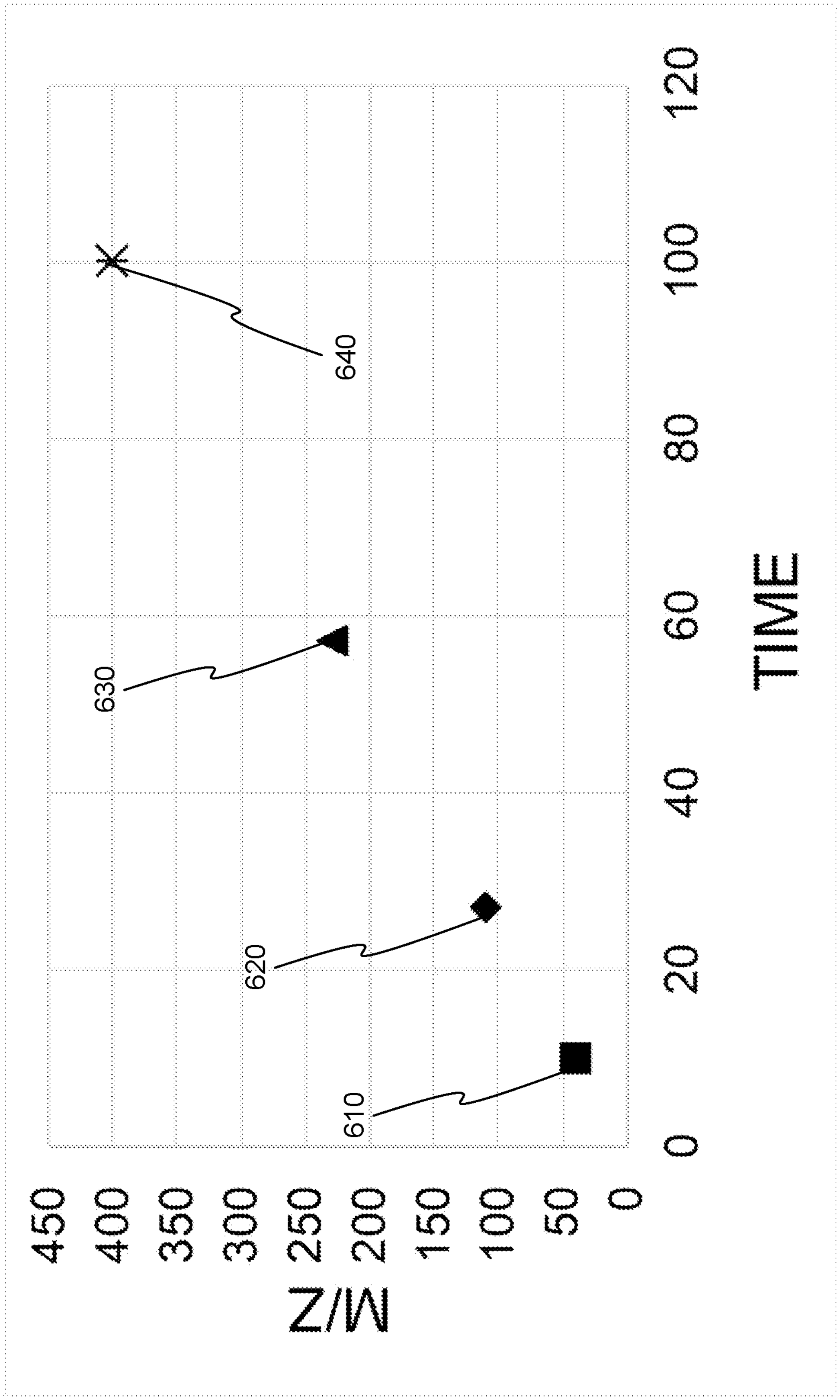
FIG. 6 is an exemplary plot of the hypothetical m/z values of three precursor ions corresponding to a known aqueous mobile phase solution compound plotted as a function of their hypothetical threshold times and shows how these m/z values and threshold times can be used to predict the threshold time of a known compound of interest, in accordance with various embodiments.

FIG. 6 is an exemplary plot 600 of the hypothetical m/z values of three precursor ions corresponding to a known aqueous mobile phase solution compound plotted as a function of their hypothetical threshold times and shows how these m/z values and threshold times can be used to predict the threshold time of a known compound of interest, in accordance with various embodiments. Precursor ion 610 has an m/z value of 41 and a threshold time of 10. Precursor ion 620 has an m/z value of 110 and a threshold time of 27. Precursor ion 630 has an m/z value of 230 and a threshold time of 57.

If a known compound of interest 640 in series of batch samples has an m/z value of 400, its threshold time, or time when it is affected by contamination, can be predicted from these precursor ion values. For example, precursor ions 610, 620, and 630 in FIG. 6 show that the threshold time of contamination appears to vary linearly with m/z value. As a result, the threshold time of contamination of known compound of interest 640 with an m/z value of 400 can be found by extrapolating from the values of precursor ions 610, 620, and 630. From this linear extrapolation, the threshold time of known compound of interest 640 is found to be 100. In other words, from the m/z and threshold time values of precursor ions 610, 620, and 630, known compound of interest 640 is predicted to be affected by orifice contamination at time 100.

Returning to FIG. 3, in various embodiments, the apparatus further includes a display device and tandem mass spectrometer 320 displays on the display device the time when the intensity of the known compound of interest is reduced due to contamination of the orifice. The display device can be a display device of processor 340, for example.

In various embodiments, tandem mass spectrometer 320 further displays on the display device a warning to clean tandem mass spectrometer 320 before the time when the intensity of the known compound of interest is reduced due to contamination of the orifice.

Figure 7:
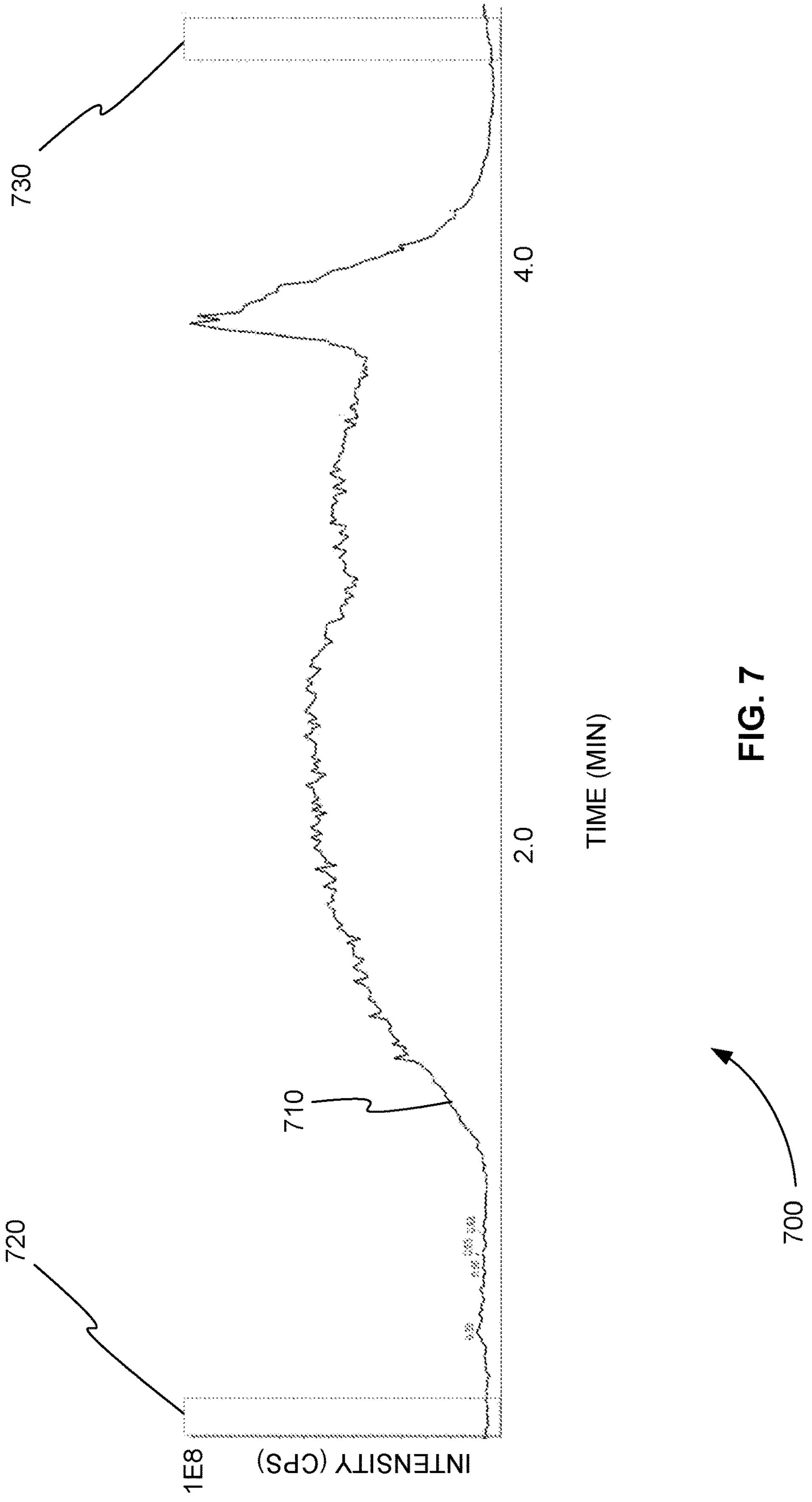
FIG. 7 is an exemplary plot of a neutral loss chromatogram for methanol showing regions before a sample analysis, during sample analysis, and after sample analysis, in accordance with various embodiments.

FIG. 7 is an exemplary plot 700 of a neutral loss chromatogram for methanol showing regions before a sample analysis, during sample analysis, and after sample analysis, in accordance with various embodiments. Chromatogram 710 includes region 720 before the sample analysis and region 730 after the sample analysis. Region 730 is also a region before another different the sample analysis. In region 720, chromatogram 710 is not significantly changing and, therefore, shows an initial steady state condition. In region 730, however, chromatogram 710 initially has a lower intensity than the intensity in region 720 but rises to a similar intensity. In other words, chromatogram 710 is in an initial steady state condition in region 720, but, in region 730, chromatogram 710 is increasing to a condition similar to the initial steady state condition in region 730.

FIG. 7 shows that intensities measured between sample experiments may need time to increase to a steady state level as the liquid sample delivery device returns to a steady state of operation. As a result, in various embodiments, two or more neutral loss or precursor ion scans are performed to determine if the intensities of the ions corresponding to the aqueous mobile phase solution compound being analyzed between sample experiments have reached a steady state.

Figure 8:
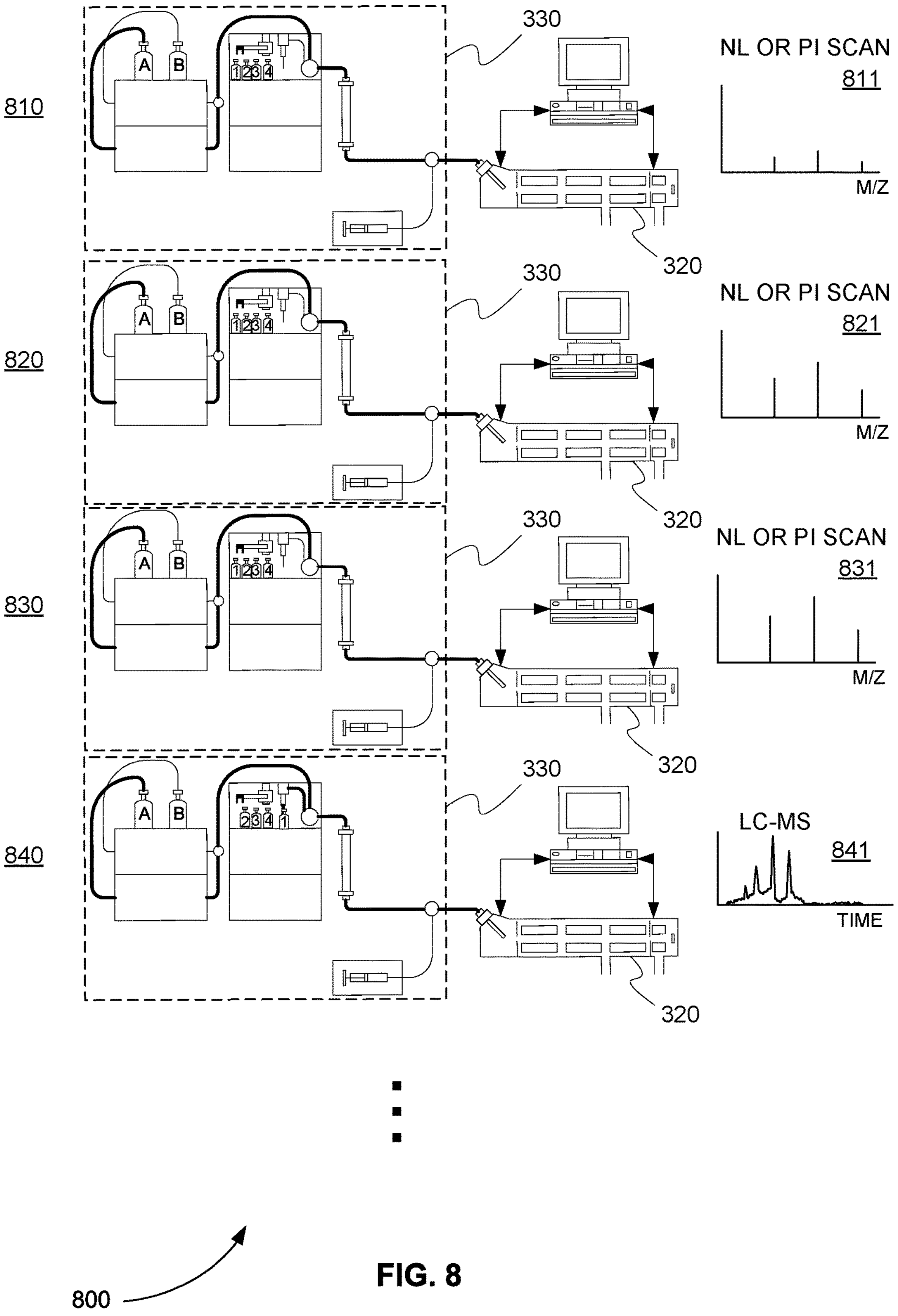
FIG. 8 is a schematic diagram showing multiple neutral loss or precursor ion scans before a sample is introduced into a liquid sample delivery device to determine if the liquid sample delivery device has reached a steady state of operation, in accordance with various embodiments.

FIG. 8 is a schematic diagram 800 showing multiple neutral loss or precursor ion scans before a sample is introduced into a liquid sample delivery device to determine if the liquid sample delivery device has reached a steady state of operation, in accordance with various embodiments. For example, diagnostic experiments 810, 820, and 830 are performed before a sample is introduced into liquid sample delivery device 330.

In each diagnostic experiment, tandem mass spectrometer 320 performs a first neutral loss or precursor ion scan. After each diagnostic experiment, intensities measured for the two or more precursor ions are compared to the intensities measured in the previous diagnostic experiment. For example, in diagnostic experiment 820, the intensities of the three precursor ions in spectrum 821 are compared to the intensities of the three precursor ions in spectrum 811 for diagnostic experiment 810. This comparison shows that these intensities increase significantly from diagnostic experiment 810 to diagnostic experiment 820. In other words, the rate of change in these intensities between the first two diagnostic experiments is high. This means that liquid sample delivery device 330 has not reached a steady state.

To more objectively measure the rate of change in these intensities, the rate of change of each intensity is compared to a threshold rate of change. If the rate of change of any of the intensities exceeds the threshold rate of change, it is determined that liquid sample delivery device 330 has not reached a steady state.

Because the rate of change in intensities of the three precursor ions in spectrum 821 between diagnostic experiment 810 and diagnostic experiment 820 exceeds a threshold rate of change, additional diagnostic experiment 830 is performed. In diagnostic experiment 830, the intensities of the three precursor ions in spectrum 831 are compared to the intensities of the three precursor ions in spectrum 821 for diagnostic experiment 820. This comparison shows that these intensities have increased only slightly from diagnostic experiment 820 to diagnostic experiment 830. In other words, the rate of change in these intensities between diagnostic experiments 820 and 830 is below a threshold rate of change. This means that liquid sample delivery device 330 has now reached a steady state and the intensities of spectrum 831 can be used to predict when measurements of a known compound of interest will be affected by orifice contamination.

After diagnostic experiment 830, a sample is introduced into liquid sample delivery device 330 and sample experiment 840 is performed, producing chromatogram 841. Additional sample experiments are performed after sample experiment 840, for example. Between each sample experiment, similar multiple diagnostic experiments can be performed.

More specifically, returning to FIG. 3, before each sample of the series of batch samples is introduced the liquid sample delivery device 330, tandem mass spectrometer 320 performs the neutral loss or precursor ion scan at two or more time periods until a rate of change of each measured intensity of the two or more different precursor ions over the two or more time periods decreases below a threshold rate of change.

In various embodiments, when the rate of change of each measured intensity of the two or more different precursor ions over the two or more time periods decreases below the threshold rate of change rate of change, tandem mass spectrometer 320 stores a measured intensity and time from the latest of the two or more time periods for each of the two or more different precursor ions in a memory device (not shown).

Also, when the rate of change of each measured intensity of the two or more different precursor ions over the two or more time periods decreases below the threshold rate of change rate of change, tandem mass spectrometer 320 compares a measured intensity from the latest of the two or more time periods for each of the two or more different precursor ions with a previously measured intensity stored in the memory device until a threshold time is found for each of the two or more different precursor ions where a measured intensity of each of the two or more different precursor ions is reduced below the threshold intensity due to contamination of the orifice.

In various embodiments, the aqueous mobile phase solution compound can be, but is not limited to, a dimer, trimer, or tetramer of a known solvent.

In various embodiments, the aqueous mobile phase solution compound is a known solvent. The known solvent can be, but is not limited to, methanol, acetonitrile, isopropyl alcohol (IPA), or acetone.

In various embodiments, the aqueous mobile phase solution compound is a known mobile phase additive. The known mobile phase additive can be, but is not limited to, formic acid, acetic acid, or ammonium formate.

In various embodiments, processor 340 is used to control or provide instructions to ion source device 310 and tandem mass spectrometer 320 and to analyze data collected. Processor 340 controls or provides instructions by, for example, controlling one or more voltage, current, or pressure sources (not shown). Processor 340 can be a separate device as shown in FIG. 3 or can be a processor or controller of one or more devices of tandem mass spectrometer 320. Processor 340 can be, but is not limited to, a controller, a computer, a microprocessor, the computer system of FIG. 1, or any device capable of sending and receiving control signals and data.

Method for Contamination Prediction

Figure 9:
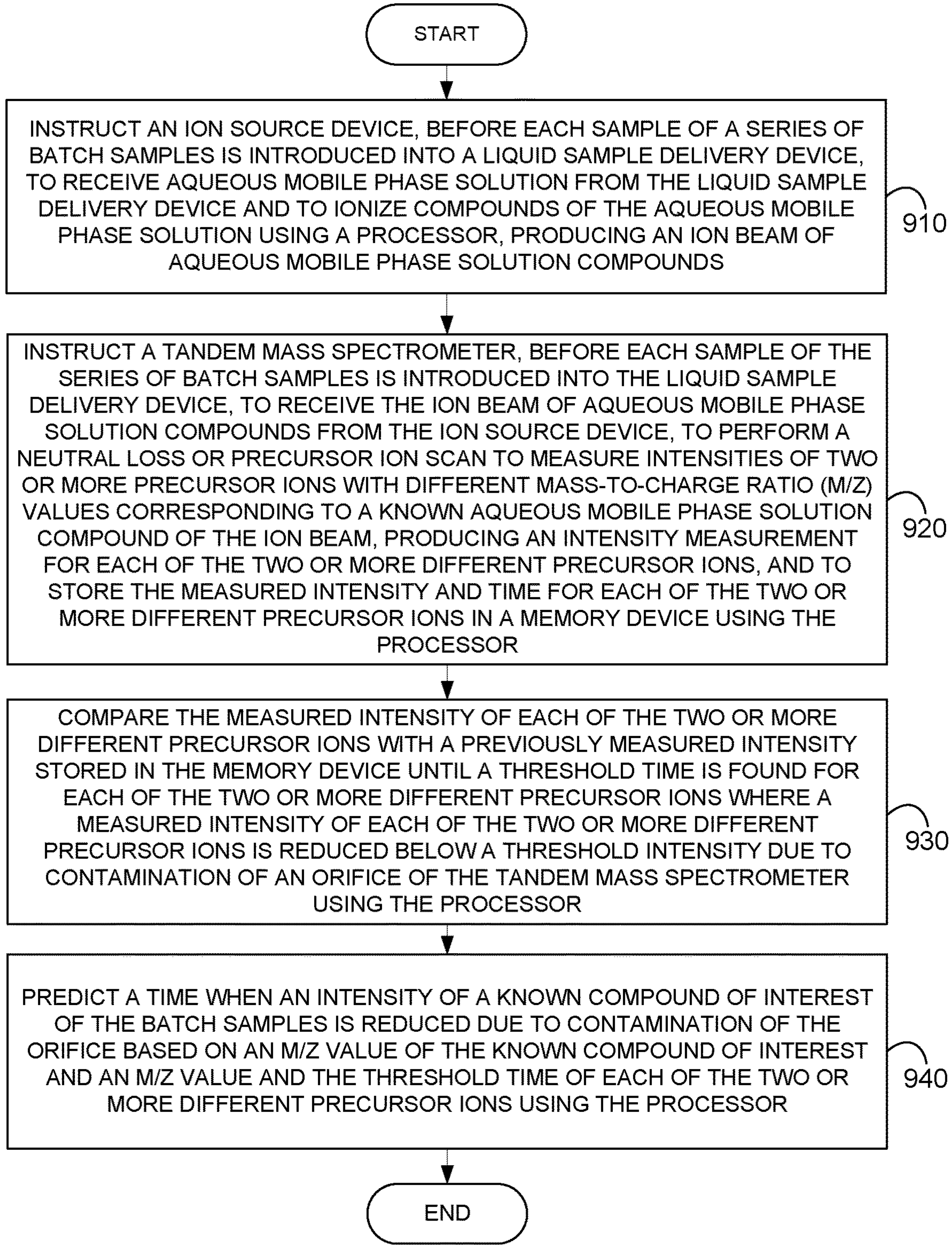
FIG. 9 is a flowchart showing a method for predicting during a batch sample analysis when a measurement of a known compound of interest will be affected by mass spectrometer orifice contamination, in accordance with various embodiments.

FIG. 9 is a flowchart 900 showing a method for predicting during a batch sample analysis when a measurement of a known compound of interest will be affected by mass spectrometer orifice contamination, in accordance with various embodiments.

In step 910 of method 900, an ion source device, before each sample of a series of batch samples is introduced into a liquid sample delivery device, is instructed to receive aqueous mobile phase solution from the liquid sample delivery device and to ionize compounds of the aqueous mobile phase solution using a processor, producing an ion beam of aqueous mobile phase solution compounds.

In step 920, a tandem mass spectrometer, before each sample of the series of batch samples is introduced into the liquid sample delivery device, is instructed to perform a number of steps using a processor. It is instructed to receive the ion beam of aqueous mobile phase solution compounds from the ion source device. It is instructed to perform a neutral loss or precursor ion scan to measure intensities of two or more precursor ions with different m/z values corresponding to a known aqueous mobile phase solution compound of the ion beam, producing an intensity measurement for each of the two or more different precursor ions. Finally, it is instructed to store the measured intensity and time for each of the two or more different precursor ions in a memory device.

In step 930, the measured intensity of each of the two or more different precursor ions is compared with a previously measured intensity stored in the memory device using the processor. This comparison is performed until a threshold time is found for each of the two or more different precursor ions where a measured intensity of each of the two or more different precursor ions is reduced below a threshold intensity due to contamination of an orifice of the tandem mass spectrometer.

In step 940, a time is predicted when an intensity of a known compound of interest of the batch samples is reduced due to contamination of the orifice based on an m/z value of the known compound of interest and an m/z value and the threshold time of each of the two or more different precursor ions using the processor.

Computer Program Product for Contamination Prediction

In various embodiments, computer program products include a tangible computer-readable storage medium whose contents include a program with instructions being executed on a processor so as to perform a method for predicting during a batch sample analysis when a measurement of a known compound of interest will be affected by mass spectrometer orifice contamination. This method is performed by a system that includes one or more distinct software modules.

Figure 10:
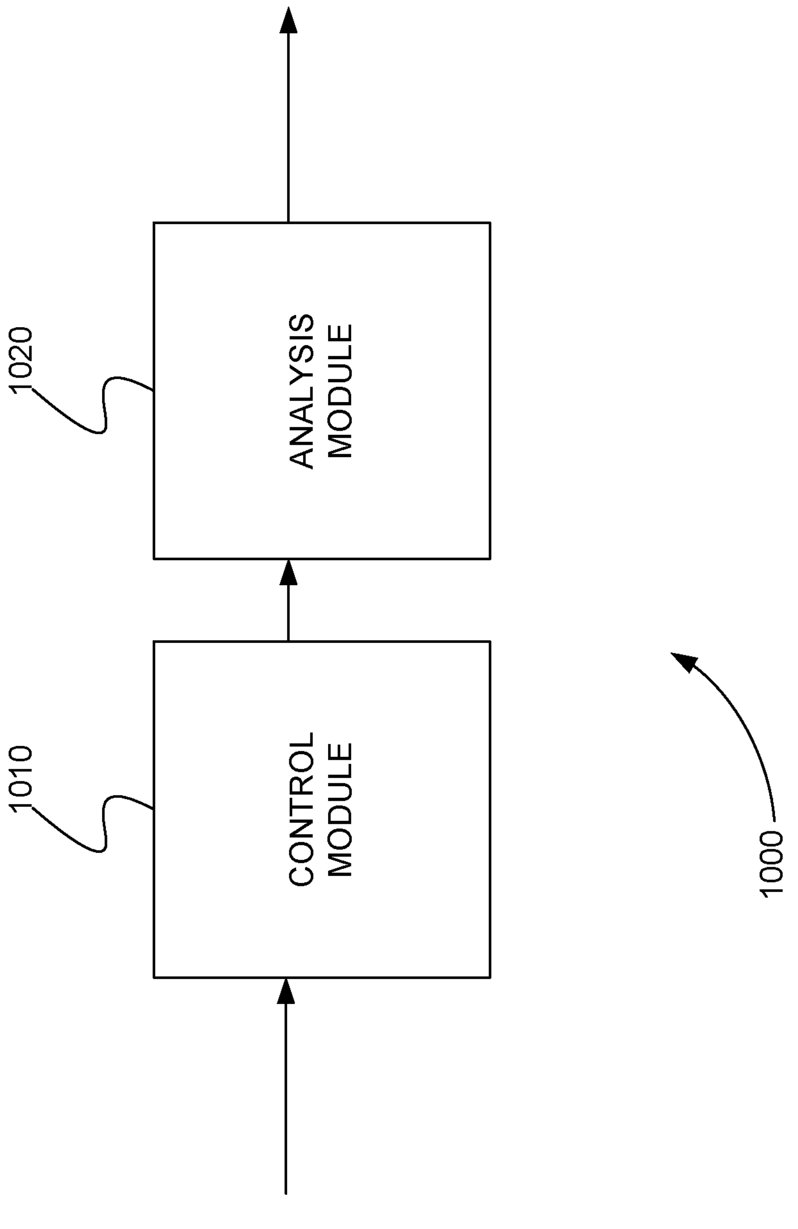
FIG. 10 is a schematic diagram of a system that includes one or more distinct software modules that perform a method for predicting during a batch sample analysis when a measurement of a known compound of interest will be affected by mass spectrometer orifice contamination, in accordance with various embodiments.

FIG. 10 is a schematic diagram of a system 1000 that includes one or more distinct software modules that perform a method for predicting during a batch sample analysis when a measurement of a known compound of interest will be affected by mass spectrometer orifice contamination, in accordance with various embodiments. System 1000 includes a control module 1010 and an analysis module 1020.

Control module 1010 instructs an ion source device, before each sample of a series of batch samples is introduced into a liquid sample delivery device, to receive aqueous mobile phase solution from the liquid sample delivery device and to ionize compounds of the aqueous mobile phase solution, producing an ion beam of aqueous mobile phase solution compounds.

Control module 1010 instructs a tandem mass spectrometer, before each sample of the series of batch samples is introduced into the liquid sample delivery device, to perform a number of steps. It is instructed to receive the ion beam of aqueous mobile phase solution compounds from the ion source device. It is instructed to perform a neutral loss or precursor ion scan to measure intensities of two or more precursor ions with different m/z values corresponding to a known aqueous mobile phase solution compound of the ion beam, producing an intensity measurement for each of the two or more different precursor ions. Finally, it is instructed to store the measured intensity and time for each of the two or more different precursor ions in a memory device.

Analysis module 1020 compares the measured intensity of each of the two or more different precursor ions with a previously measured intensity stored in the memory device. This comparison is performed until a threshold time is found for each of the two or more different precursor ions where a measured intensity of each of the two or more different precursor ions is reduced below a threshold intensity due to contamination of an orifice of the tandem mass spectrometer.

Analysis module 1020 predicts a time when an intensity of a known compound of interest of the batch samples is reduced due to contamination of the orifice based on an m/z value of the known compound of interest and an m/z value and the threshold time of each of the two or more different precursor ions.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. Apparatus for predicting during a batch sample analysis when a measurement of a known compound of interest will be affected by mass spectrometer orifice contamination, comprising:

an ion source device that, before each sample of a series of batch samples is introduced into a liquid sample delivery device, receives aqueous mobile phase solution from the liquid sample delivery device and ionizes compounds of the aqueous mobile phase solution, producing an ion beam of aqueous mobile phase solution compounds; and a tandem mass spectrometer that, before each sample of the series of batch samples is introduced into the liquid sample delivery device, receives the ion beam of aqueous mobile phase solution compounds from the ion source device, performs a neutral loss or precursor ion scan to measure intensities of two or more precursor ions with different mass-to-charge ratio (m/z) values corresponding to a known aqueous mobile phase solution compound of the ion beam, producing an intensity measurement for each of the two or more different precursor ions, stores the measured intensity and time for each of the two or more different precursor ions in a memory device, compares the measured intensity of each of the two or more different precursor ions with a previously measured intensity stored in the memory device until a threshold time is found for each of the two or more different precursor ions where a measured intensity of each of the two or more different precursor ions is reduced below a threshold intensity due to contamination of an orifice of the tandem mass spectrometer, and predicting a time when an intensity of a known compound of interest of the batch samples is reduced due to contamination of the orifice based on an m/z value of the known compound of interest and an m/z value and the threshold time of each of the two or more different precursor ions.

2. The apparatus of claim 1, further comprising a display device, wherein the tandem mass spectrometer displays on the display device the time when the intensity of the known compound of interest is reduced due to contamination of the orifice.

3. The apparatus of claim 2, wherein the tandem mass spectrometer further displays on the display device a warning to clean the tandem mass spectrometer before the time when the intensity of the known compound of interest is reduced due to contamination of the orifice.

4. The apparatus of claim 1, wherein, before each sample of the series of batch samples is introduced into the liquid sample delivery device, the tandem mass spectrometer performs the neutral loss or precursor ion scan at two or more time periods until a rate of change of each measured intensity of the two or more different precursor ions over the two or more time periods decreases below a threshold rate of change.

5. The apparatus of claim 4, wherein, when the rate of change of each measured intensity of the two or more different precursor ions over the two or more time periods decreases below the threshold rate of change rate of change, the tandem mass spectrometer stores a measured intensity and time from the latest of the two or more time periods for each of the two or more different precursor ions in a memory device.

6. The apparatus of claim 5, wherein, when the rate of change of each measured intensity of the two or more different precursor ions over the two or more time periods decreases below the threshold rate of change rate of change, the tandem mass spectrometer compares a measured intensity from the latest of the two or more time periods for each of the two or more different precursor ions with a previously measured intensity stored in the memory device until a threshold time is found for each of the two or more different precursor ions where a measured intensity of each of the two or more different precursor ions is reduced below the threshold intensity due to contamination of the orifice.

7. The apparatus of claim 1, wherein the aqueous mobile phase solution compound comprises a dimer, trimer, or tetramer of a known solvent.

8. The apparatus of claim 1, wherein the known aqueous mobile phase solution compound comprises a known solvent.

9. The apparatus of claim 8, wherein the known solvent comprises methanol.

10. The apparatus of claim 8, wherein the known solvent comprises acetonitrile.

11. The apparatus of claim 8, wherein the known solvent comprises one of isopropyl alcohol (IPA) or acetone.

12. The apparatus of claim 1, wherein the known aqueous mobile phase solution compound comprises a known mobile phase additive.

13. The apparatus of claim 12, wherein the known mobile phase additive comprises one of, formic acid, acetic acid, and ammonium formate.

14. A method for predicting during a batch sample analysis when a measurement of a known compound of interest will be affected by mass spectrometer orifice contamination, comprising:

instructing an ion source device, before each sample of a series of batch samples is introduced into a liquid sample delivery device, to receive aqueous mobile phase solution from the liquid sample delivery device and to ionize compounds of the aqueous mobile phase solution using a processor, producing an ion beam of aqueous mobile phase solution compounds;

instructing a tandem mass spectrometer, before each sample of the series of batch samples is introduced into the liquid sample delivery device, to receive the ion beam of aqueous mobile phase solution compounds from the ion source device, to perform a neutral loss or precursor ion scan to measure intensities of two or more precursor ions with different mass-to-charge ratio (m/z) values corresponding to a known aqueous mobile phase solution compound of the ion beam, producing an intensity measurement for each of the two or more different precursor ions and to store the measured intensity and time for each of the two or more different precursor ions in a memory device;

comparing the measured intensity of each of the two or more different precursor ions with a previously measured intensity stored in the memory device until a threshold time is found for each of the two or more different precursor ions where a measured intensity of each of the two or more different precursor ions is reduced below a threshold intensity due to contamination of an orifice of the tandem mass spectrometer; and predicting a time when an intensity of a known compound of interest of the batch samples is reduced due to contamination of the orifice based on an m/z value of the known compound of interest and an m/z value and the threshold time of each of the two or more different precursor ions using the processor.

15. A computer program product, comprising a non-transitory and tangible computer-readable storage medium whose contents include a program with instructions being executed on a processor to perform a method for predicting during a batch sample analysis when a measurement of a known compound of interest will be affected by mass spectrometer orifice contamination, the method comprising:

providing a system, wherein the system comprises one or more distinct software modules, and wherein the distinct software modules comprise a control module and an analysis module;

instructing an ion source device, before each sample of a series of batch samples is introduced into a liquid sample delivery device, to receive aqueous mobile phase solution from the liquid sample delivery device and to ionize compounds of the aqueous mobile phase solution using the control module, producing an ion beam of aqueous mobile phase solution compounds;

instructing a tandem mass spectrometer, before each sample of the series of batch samples is introduced into the liquid sample delivery device, to receive the ion beam of aqueous mobile phase solution compounds from the ion source device, to perform a neutral loss or precursor ion scan to measure intensities of two or more precursor ions with different mass-to-charge ratio (m/z) values corresponding to a known aqueous mobile phase solution compound of the ion beam, producing an intensity measurement for each of the two or more different precursor ions, and to store the measured intensity and time for each of the two or more different precursor ions in a memory device using the control module;

comparing the measured intensity of each of the two or more different precursor ions with a previously measured intensity stored in the memory device until a threshold time is found for each of the two or more different precursor ions where a measured intensity of each of the two or more different precursor ions is reduced below a threshold intensity due to contamination of an orifice of the tandem mass spectrometer using the analysis module; and predicting a time when an intensity of a known compound of interest of the batch samples is reduced due to contamination of the orifice based on an m/z value of the known compound of interest and an m/z value and the threshold time of each of the two or more different precursor ions using the analysis module.

* * * * *